(No Model.) 2 Sheets—Sheet 1.
W. LOBACH.
CONDUIT ELECTRIC RAILWAY.
No. 560,807. Patented May 26, 1896.
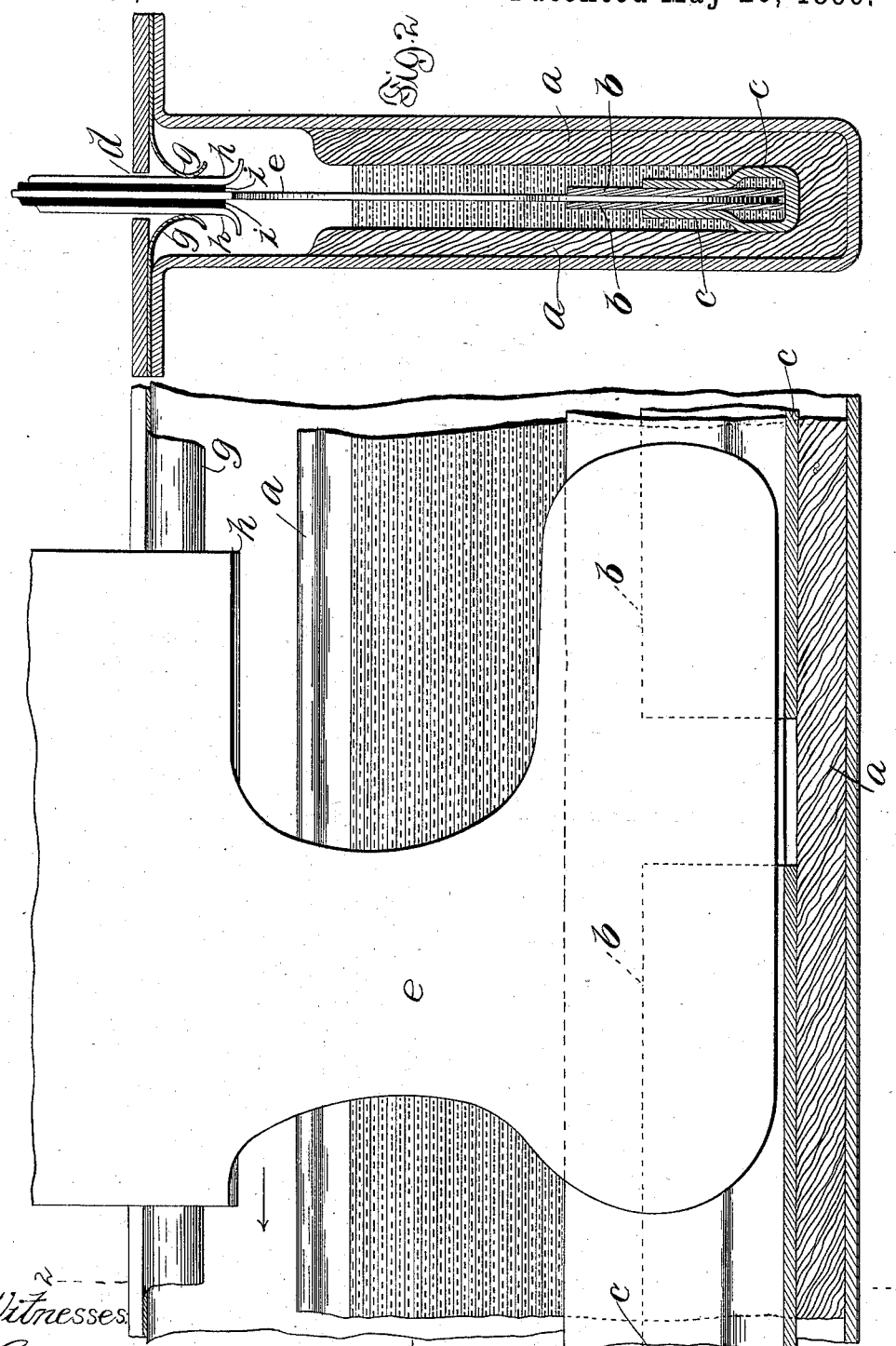
Witnesses
George L. Cragg
Walter Clyde Jones
Inventor
Walter Lobach
By Barton & Brown,
Attorneys.

(No Model.) 2 Sheets—Sheet 2.

W. LOBACH.
CONDUIT ELECTRIC RAILWAY.

No. 560,807. Patented May 26, 1896.

Witnesses:
George L. Cragg
Walter Clyde Jones

Inventor
Walter Lobach
By Barton & Brown
Attorneys

UNITED STATES PATENT OFFICE.

WALTER LOBACH, OF CHICAGO, ILLINOIS, ASSIGNOR OF ONE-HALF TO FRANCIS B. BADT, OF SAME PLACE.

CONDUIT ELECTRIC RAILWAY.

SPECIFICATION forming part of Letters Patent No. 560,807, dated May 26, 1896.

Application filed April 23, 1894. Serial No. 508,603. (No model.)

*To all whom it may concern:*

Be it known that I, WALTER LOBACH, a subject of the Emperor of Germany, residing at Chicago, in the county of Cook and State of Illinois, have invented a certain new and useful Improvement in Conduit Electric Railways, (Case No. 1,) of which the following is a full, clear, concise, and exact description, reference being had to the accompanying drawings, forming a part of this specification.

My invention relates to conduit electric railways; and its object is the provision of means whereby the entrance of water into the conduit may not result in a leakage of the current to ground nor otherwise impair the operation of the system.

My invention in its preferred form comprises an electric conductor immersed in an insulating liquid heavier than water, a contact-making device carried upon the car being adapted to move in contact with the electric conductor to convey the current to the motor on the car. Any water that may find access to the conduit will rest upon the surface of the insulating liquid, and thus be prevented from coming in contact with the conductor. The contact-making device is provided with an insulating-covering, which prevents the same from coming in electrical contact with the water.

My invention will be readily understood by reference to the accompanying drawings, in which—

Figure 3:
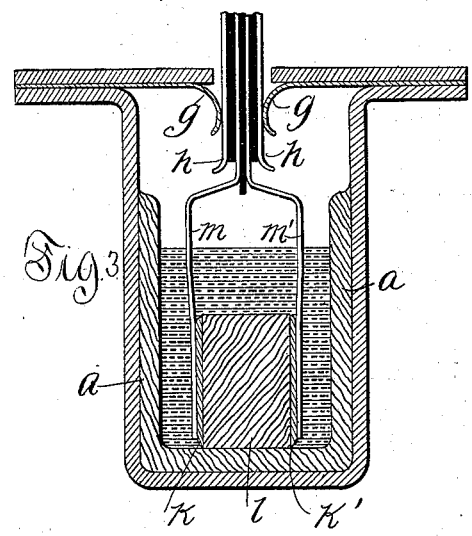
Figure 6:
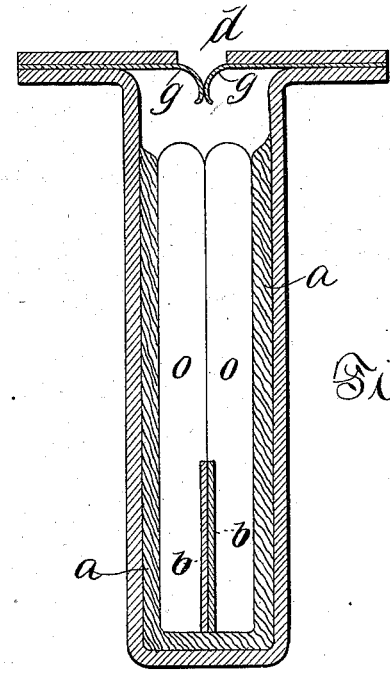
Figure 5:
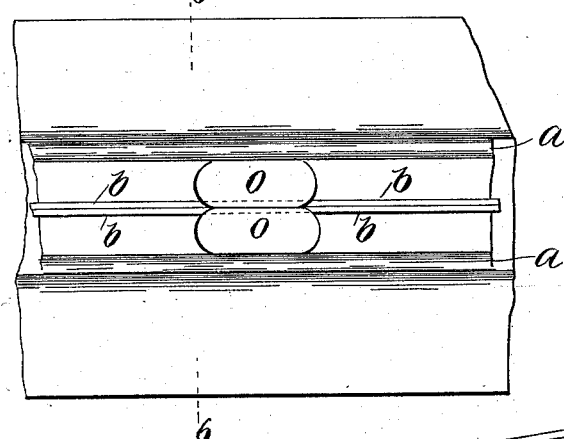
Figure 4:
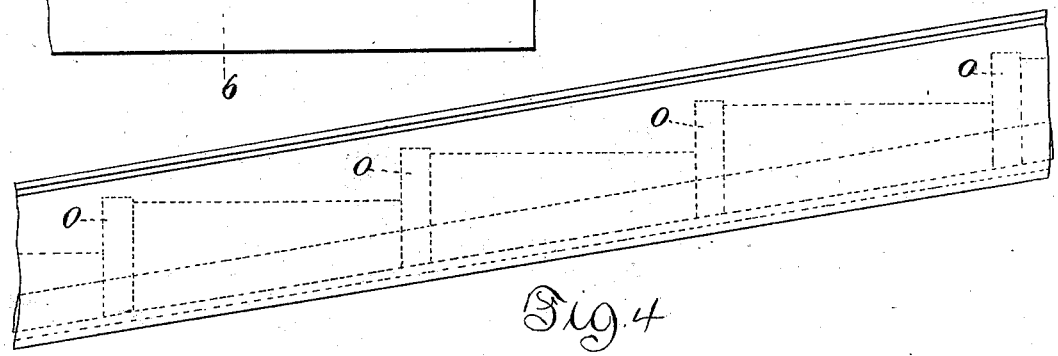

Figure 1 is an elevation of the conduit and the contact-making device, the front wall of the conduit being broken away. Fig. 2 is a sectional view on line 2 2, Fig. 1. Fig. 3 is a transverse view of a form of conduit for direct and return conductors. Fig. 4 represents a section of the conduit upon an incline, showing the manner of maintaining the conductor immersed in the liquid. Fig. 5 is a detail view showing the rubber pillows that maintain the liquid within the compartments of the inclined conduit. Fig. 6 is a view on line 6 6, Fig. 5.

Like letters refer to like parts in the several figures.

The walls of the conduit may be formed in any desired manner and of any proper material and are preferably lined with an insulating material $a$, which may be made of wood. In the bottom of the conduit is provided the electrical conductor, which in the present instance comprises a pair of plates $b$ $b$, normally pressed together by the cramp $c$. The conduit is filled with an insulating liquid heavier than water to a distance above the tops of the plates $b$ $b$. At the top of the conduit is provided a slot $d$ of a width sufficient to accommodate the contact-making device carried upon the car. As shown in Figs. 1 and 2, the contact-making device consists of a thin plate $e$, adapted to pass between the plates $b$ $b$ and to make contact therewith, the resiliency of the cramp $c$ serving to cause the plates to bear against the plate $e$ with some force. The plate is made of decreased width above the plates $b$, so that the adhesion between the water and the faces of the plate may be a minimum. The forward edge of the plate may be made sharp, so as to cleave the liquid.

Beneath the slot $d$ are provided a pair of plates $g$ $g$ with curved edges adapted to make contact, except when the contact device is passing, and thus prevent the entrance to the conduit of solid bodies. A pair of plates $h$ $h$ are provided, one upon each side of the contact-plate $e$, against which the plates $g$ $g$ may rub as the contact-plate passes, layers of insulating material $i$ $i$ being interposed between said plates and the plate $e$. The lower edges of the plates $h$ $h$ are curved outward to limit the upward movement of the liquid due to the passage therethrough of the plate $e$. The surface of the plate $e$ is provided with an insulation, preferably shellac, at the upper end, which prevents water that may enter the conduit and rest upon the surface of the liquid from coming into electrical contact with said plate $e$. Fig. 3 shows a manner of applying my invention to a system provided with a direct and return conductor in the conduit. The direct and return conductors $k$ $k'$ are mounted one upon each side of a central block of insulating material $l$, which may be made of wood. The contact device may comprise a pair of plates $m$ $m'$, adapted to make contact, one with each of the conductors $k$ $k'$. When the conduit is on an incline, a number of compartments are provided in the conduit of such length that the conductor may be completely immersed in the liquid. Between the compartments are provided elastic partition-walls o o, of rubber or other suitable material, which rest with their faces in contact to prevent the passage of the liquid between them, the partition-walls being of such dimension that the plate e may pass between them without permitting the outflow of the liquid, the surfaces closing together in front of and behind the plate as it passes.

In the preferred form of my invention I employ a liquid heavier than water; but I consider the employment of any insulating liquid as within the scope of my invention. I find tar, especially naphtha-tar, obtained as a waste product in the production of gas from naphtha-oil, suitable for this purpose. To increase the specific gravity of the tar, it may be mixed with some heavy insulating-powder, as red lead. It will be understood, therefore, that I do not limit myself to the use of an insulating material which is freely liquid; but the same may be plastic without departing from the spirit of my invention. The degree of fluidity of the material will in any case vary somewhat with the temperature of surrounding objects. I have therefore in the claims employed the comprehensive term "fluid" to include all degrees of fluidity of the insulating material which may be found practicable or desirable.

It is evident that my invention is susceptible of modifications, and that the insulating liquid may be applied to other than electric-railway conduits, and I do not, therefore, desire to limit myself to particulars; but, Having described my invention, what I claim as new, and desire to secure by Letters Patent, is—

1. In an electric railway, the combination with a conduit, of an insulating liquid heavier than water contained therein, an electric conductor immersed in said liquid, and a contact device carried upon the car and adapted to make contact with said conductor, substantially as described.

2. In an electric railway, the combination with a conduit, of an insulating liquid heavier than water contained therein, an electric conductor immersed in said liquid, said conductor comprising a pair of plates yieldingly held together, and a contact-plate carried upon the car and adapted to be passed between said plates, substantially as described.

3. In a conduit-electric-railway system, a trough extending along the track, a working conductor supported in said trough, fluid insulating material in said trough and surrounding said conductor, and a collecting device extending from the car on said railway and making contact with said conductor, substantially as described.

4. In an electric railway, the combination with a conduit, of an insulating liquid heavier than water contained therein, a pair of plates yieldingly held together and immersed in said liquid, and a contact-plate carried upon the car and adapted to be passed between said plates, said contact-plate being of decreased width above said plates, substantially as described.

5. In an electric railway, the combination with a conduit, of an insulating liquid heavier than water contained therein, an electric conductor immersed in said liquid, and a thin plate carried upon the car adapted to be passed through said liquid in contact with said conductor, substantially as described.

6. In an electric railway, the combination with a conduit, of an insulating liquid heavier than water contained therein, an electric conductor immersed in said liquid, a contact device carried upon the car and adapted to make contact with said conductor, said contact device being provided with an insulating coating above the surface of said liquid, substantially as described.

7. In an electric railway, the combination with an inclined conduit composed of compartments, of a liquid heavier than water contained in said compartments, an electric conductor immersed in said liquid, a contact device carried upon the car and adapted to make contact with said conductor and means for preventing the flow of liquid from the more elevated compartments, substantially as described.

In witness whereof I hereunto subscribe my name this 19th day of April, A. D. 1894.

WALTER LOBACH.

Witnesses:
W. CLYDE JONES,
GEORGE L. CRAGG.